March 26, 1968  F. Z. GOOSMAN  3,374,811
LIQUID MEASURING AND DISPENSING APPARATUS
Filed Aug. 12, 1965  4 Sheets-Sheet 1

INVENTOR
Frederick Z. Goosman
BY Borst & Borst
ATTORNEYS

March 26, 1968  F. Z. GOOSMAN  3,374,811
LIQUID MEASURING AND DISPENSING APPARATUS
Filed Aug. 12, 1965  4 Sheets-Sheet 3

March 26, 1968  F. Z. GOOSMAN  3,374,811
LIQUID MEASURING AND DISPENSING APPARATUS
Filed Aug. 12, 1965  4 Sheets-Sheet 4
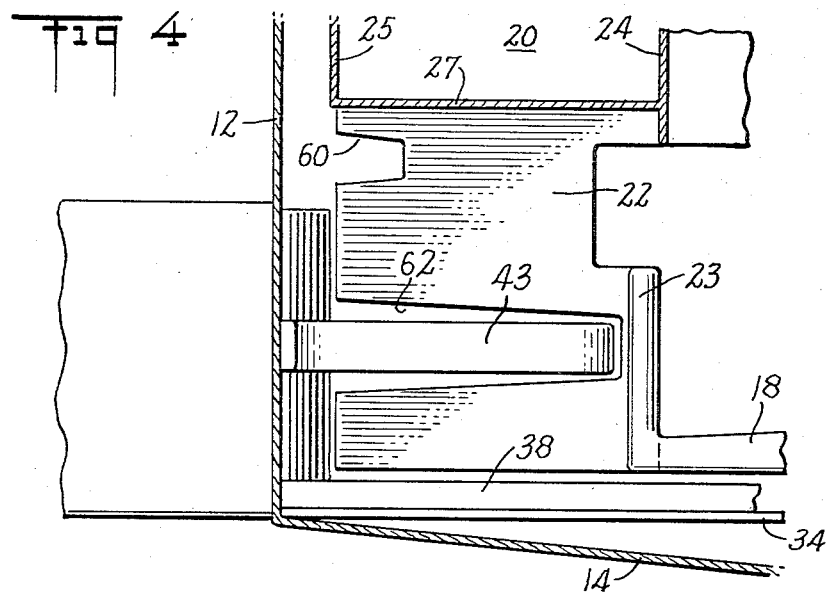
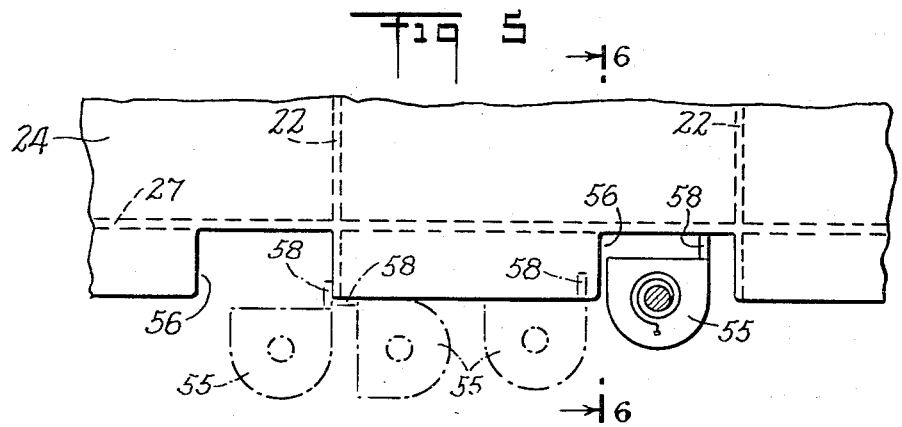
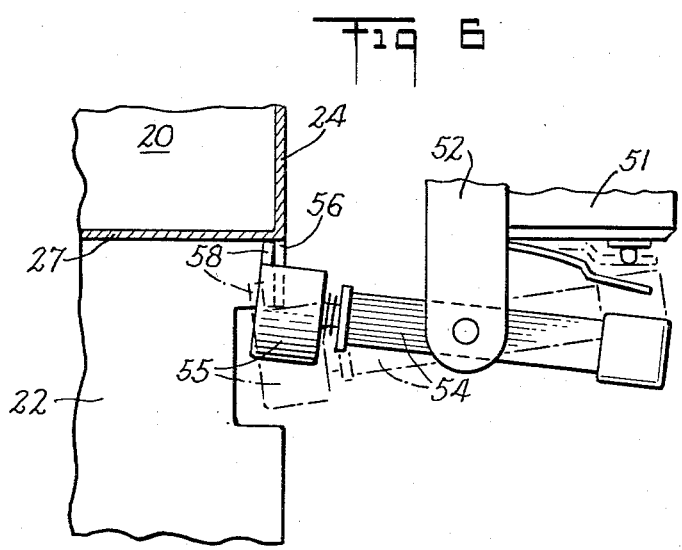

United States Patent Office 3,374,811
Patented Mar. 26, 1968

3,374,811
LIQUID MEASURING AND
DISPENSING APPARATUS
Frederick Z. Goosman, 200 E. 57th St.,
New York, N.Y. 10022
Filed Aug. 12, 1965, Ser. No. 479,135
4 Claims. (Cl. 141—145)

ABSTRACT OF THE DISCLOSURE

A liquid measuring and dispensing machine having a plurality of measuring compartments rotatably driven. Pusher elements depend from each compartment to engage an equal plurality of receptacles slidably disposed on a track. Each compartment has a weir for predetermining its fill level and a valve means dynamically controlled in operation to discharge its liquid content into its corresponding receptacle. Filling means for each compartment consists of several nozzles capable of delivery at different flow velocities and means are provided to assure the return of liquid spilling over the weirs to such filling means.

---

This invention relates to apparatus and process for filling containers with liquid and, in particular, to liquid filling devices which afford means for measuring the quantity of liquid being dispensed simultaneously with their filling operations.

Various types of apparatus are known for filling receptacles with fungible materials and liquids and which provide means for automatic cut-off at the end of operating intervals determined by mechanical or other means. Such mechanisms have certain drawbacks due principally to the fact that uniform flow in dispensing the materials cannot always be assured. According to the present invention the quantity dispensed into the receptacle can be predetermined with accuracy in that the cut-off time is made relative to the amount of such material actually received by the receptacle. In general, this relation is achieved by filling the receptacle until spill-over occurs and providing means which are responsive to the overflow to maintain or check the operation of the dispensing apparatus. In addition, provision is made to assure that there will be no waste due to the spilled material. Such assurance is provided by recirculating the material back to the source which serves the dispenser.

One object of the invention is to provide a new and improved liquid dispenser.

Another object of the invention is to provide an improved liquid measuring and dispensing device.

Figure 1:
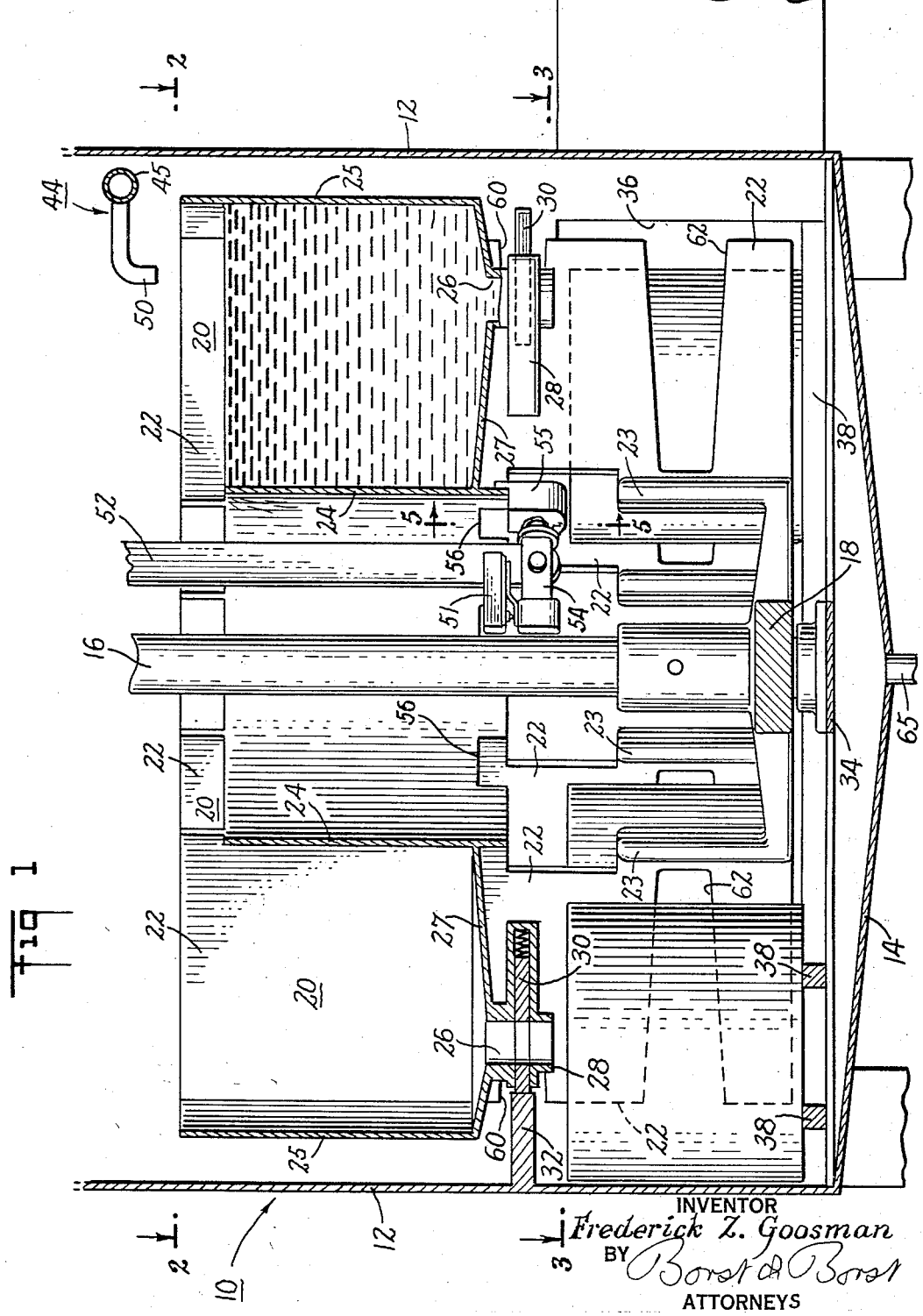
Figure 2:
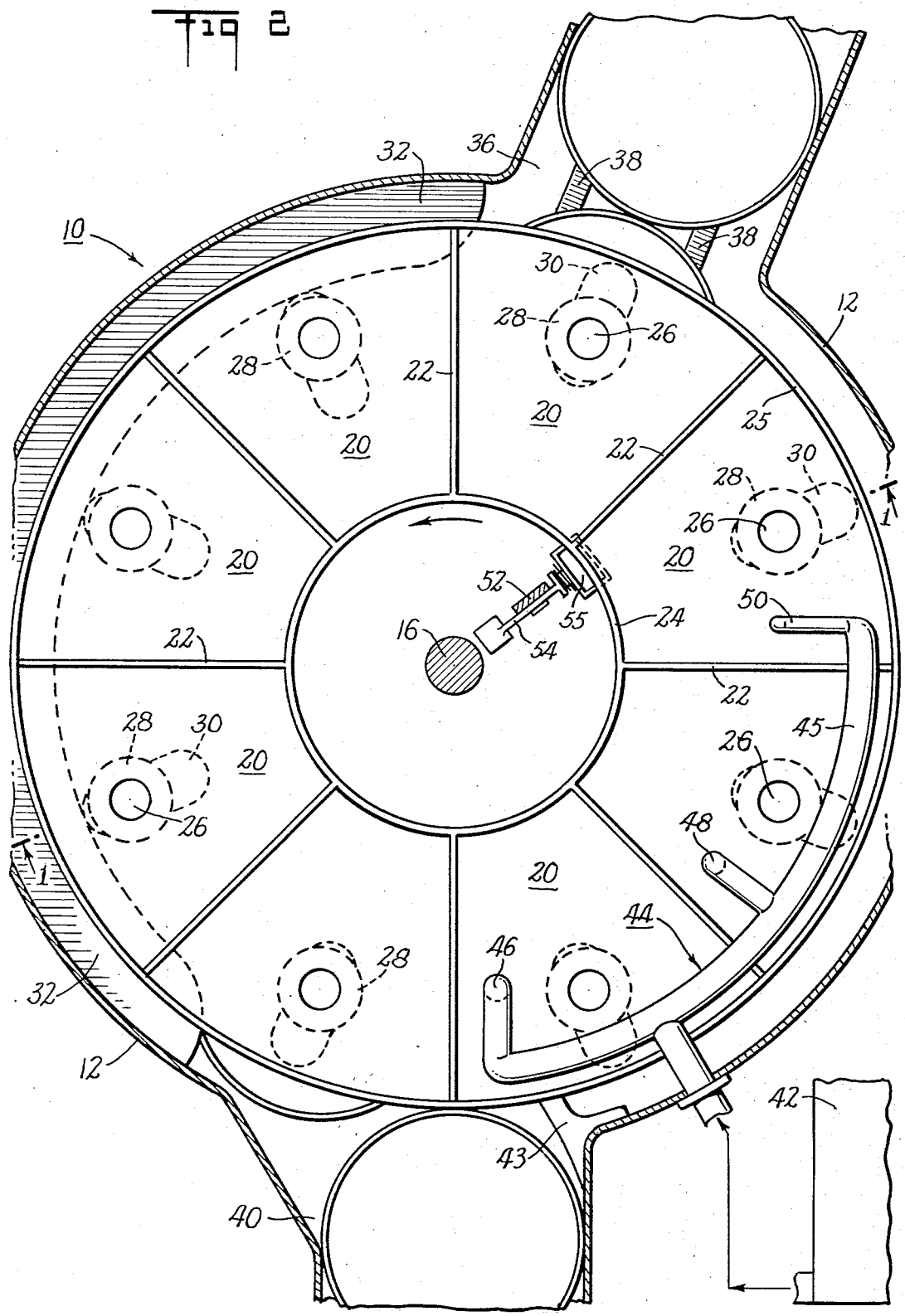
Figure 3:
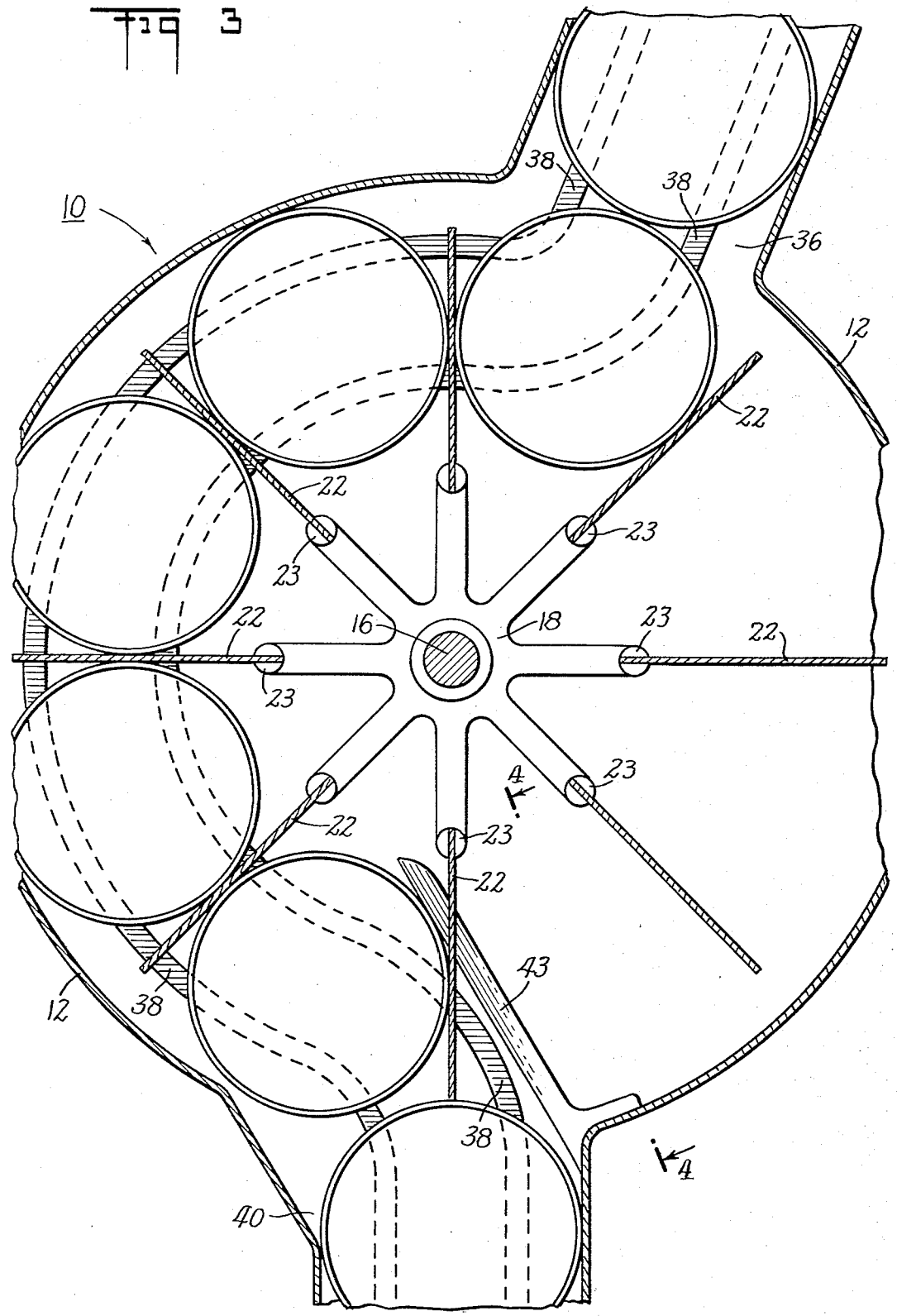

Other objects and advantages of the invention may be appreciated on reading the following detailed description of one embodiment thereof taken with respect to the accompanying drawings, in which:

FIG. 1 is an elevation in section showing the liquid dispenser taken on line 1—1 of FIG. 2;
FIG. 2 is a plan section taken on line 2—2 of FIG. 1;
FIG. 3 is a plan section taken on the line 3—3 of FIG. 1;
FIG. 4 is a section taken on the line 4—4 of FIG. 3;
FIG. 5 is a section taken on the line 5—5 of FIG. 1; and
FIG. 6 is a section taken on the line 6—6 of FIG. 5.

As shown in the drawings the liquid dispensing apparatus is housed in a casing 10 having an outer cylindrical wall 12 and bottom sump 14. A drive shaft 16 driven by a motor (not shown) is disposed in the axial center of the casing.

As shown in FIGURE 1, a spider 18 is mounted on the drive shaft, there being supported thereby a plurality of liquid receiving compartments 20. Each compartment is formed by radially extending partition plates 22 attached to upstanding spider fingers 23, an inner sleeve 24, outer sleeve 25 and annular base 27.

The base is provided in each compartment with an orifice 26 which is in communication with valve 28 having a spring biased, valve slide 30. The slide is centrally apertured and is adapted to engage cam track 32 which is attached to a portion of the inner wall of the casing.

The drive shaft 16 is journalled in stationary platform 34 located in the bottom of the casing. Underneath the compartments 20 the partition plates form chambers to receive the receptacles to be filled which enter the revolving chambers through an opening 36 in the casing, slide on tracks 38 supported on the platform 34 and cammed out through opening 40 in the casing by means of finger 43 mounted on the casing near the opening 40.

As shown in FIG. 2, a liquid supply 42 is connected to a manifold 44 consisting of a conduit 45 having at one end a large outlet nozzle 46, an intermediate size outlet nozzle 48 connected centrally of the conduit and a small outlet nozzle 50 at the other end of the conduit. The manifold is supported by the casing over three of the compartments 20 as they are rotated on the drive shaft.

A micro switch 51 is attached to a post 52 mounted within the casing. A rocker arm 54 is pivotally attached to the post and is adapted to open and shut the switch. The outer end of the arm carries a small swivel pail 55, which engages the underside of the inner sleeve 24. As shown in FIG. 5, this underside is provided with cut-out portions 56. Due to engagement of the pail with the lowermost edge of the sleeve underside, the arm is kept level and the switch is shut. However, as shown in FIG. 6, when the sleeve is rotated to the point where a cut-out portion is over the pail, the arm may be pivoted out of switch contact. As explained below, the switch pail 55 is positioned to receive spill-over from the compartment 20 after being filled by the outlet 50. The pail has an upstanding element 58, is successively emptied as the element strikes a wall in a cut-out portion 56.

The partitions 22 are formed with cut away areas 60 and 62 as shown in FIG. 4, to permit passage of the finger 43 and cam track 32 during operation. The top edge of the inner sleeve 24 is lower than that of the outer sleeve and serves as a weir to permit the spill-over as the compartments 20 are successively passed under the three outlets and incrementally filled thereby. The spill-over is mainly caught in the tapered sump 14 which has an outlet pipe 65 to return the liquid to the supply. Some of the spill-over is received in the pail 55 which will remain level as the cut out areas 56 in the sleeve pass thereover. However, if spill-over does not occur for some reason, the pail will pivot up into a cut out area of the sleeve and open the micro switch to shut off operation of the dispenser. The successive emptyings of the pail is necessary to test for the quantity that is expected to fill each compartment. After the compartments are filled and rotated to the region of the cam track 32, their valves are opened to fill the containers thereunder being pushed along the track 38 to the exit point. The receptacles arriving at the exit will have the same quantity of liquid fill, a fact which is assured by the provision for completely filling the compartments 20 according to the height of the inner sleeve 24 which serves as a weir for each compartments.

Various modifications of the dispensing apparatus may be made by persons skilled in the art without departing from the scope and principle of the invention as defined in the appended claims.

What is claimed is:
1. In a dispensing apparatus a plurality of annularly arranged compartments, a member depending from each compartment for pushing engagement with a receptacle disposed thereunder, a rotatable drive shaft on which said compartments are mounted, a normally closed valve communicating with each of said compartments and adapted to be opened for dispensing the material in said compartments into the receptacles thereunder, valve opening means mounted for engagement with the valves during part of the shaft driven travel of said compartments, means for filling said compartments with material, a sump disposed under said receptacle pushing members and means for returning material in the sump to said filling means, said filling means including a plurality of outlets connected to the sump, each outlet having means to produce a different rate of material flow from that of the other outlets.

2. In a dispensing apparatus a plurality of annularly arranged compartments, each compartment having a side portion forming a weir whereby any material entering the compartments will fill to a preselected level depending on the height of said weir, a member depending from each compartment for pushing engagement with a receptacle disposed thereunder, a rotatable drive shaft on which said compartments are mounted, a normally closed valve communicating with each of said compartments and adapted to be opened for dispensing the material in said compartments into the receptacles thereunder, valve opening means mounted for engagement with the valves during part of the shaft driven travel of said compartments, means for filling said compartments with material, a sump disposed under said receptacle pushing members and means for returning material in the sump to said filling means.

3. In a dispensing apparatus a plurality of annularly arranged compartments, each compartment having a side portion forming a weir whereby any material entering the compartments will fill to a preselected level depending on the height of said weir, a member depending from each compartment for pushing engagement with a receptacle disposed thereunder, a rotatable drive shaft on which said compartments are mounted, a normally closed valve communicating with each of said compartments and adapted to be opened for dispensing the material in said compartments into the receptacles thereunder, valve opening means mounted for engagement with the valves during part of the shaft driven travel of said compartments, means for filling said compartments with material, a sump disposed under said receptacle pushing members and means for returning material in the sump to said filling means, said filling means including a plurality of outlets connected to the sump, each outlet having means to produce a different rate of material flow from that of the other outlets.

4. In a dispensing apparatus a plurality of annularly arranged compartments, each compartment having a side portion forming a weir whereby any material entering the compartments will fill to a preselected level depending on the height of said weir, a member depending from each compartment for pushing engagement with a receptacle disposed thereunder, a rotatable drive shaft on which said compartments are mounted, a normally closed valve communicating with each of said compartments and adapted to be opened for dispensing the material in said compartments into the receptacles thereunder, valve opening means mounted for engagement with the valves during part of the shaft driven travel of said compartments, means for filling said compartments with material, a sump disposed under said receptacle pushing members and means for returning material in the sump to said filling means, said filling means including a plurality of outlets connected to the sump, each outlet having means to produce a different rate of material flow from that of the other outlets and means located under the compartments for maintaining operation of the apparatus as long as material is flowing from the weir sides of said compartments.

References Cited

UNITED STATES PATENTS

| | | | |
|---|---|---|---|
| 888,464 | 5/1908 | Burr et al. | 222—144 X |
| 1,657,264 | 1/1928 | Lauterbur | 222—424 X |
| 2,888,962 | 6/1959 | Ammon | 141—145 X |
| 2,904,221 | 9/1959 | Carter | 141—147 X |
| 2,982,319 | 5/1961 | Magnuson | 141—160 |

FOREIGN PATENTS

| | | |
|---|---|---|
| 1,115,633 | 10/1961 | Germany. |

LAVERNE D. GEIGER, *Primary Examiner.*

H. S. BELL, *Examiner.*